(12) United States Patent
Yan et al.

(10) Patent No.: US 8,861,317 B1
(45) Date of Patent: Oct. 14, 2014

(54) HEAT ASSISTED MAGNETIC RECORDING TRANSDUCER HAVING PROTECTIVE PADS

(71) Applicant: Western Digital (Fremont), LLC, Fremont, CA (US)

(72) Inventors: Wentao Yan, Fremont, CA (US); Yu Lo, Foster City, CA (US); David E. Fowler, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/903,121

(22) Filed: May 28, 2013

Related U.S. Application Data (60) Provisional application No. 61/807,530, filed on Apr. 2, 2013.

(51) Int. Cl.
  *G11B 11/00* (2006.01)
  *G11B 13/08* (2006.01)

(52) U.S. Cl.
  CPC ..................................... *G11B 13/08* (2013.01)
  USPC ................. 369/13.33; 369/13.13; 369/112.27

(58) Field of Classification Search
  CPC .. G11B 5/3116; G11B 5/3163; G11B 5/3123; G11B 5/02; G11B 5/3136; G11B 5/3106; G11B 5/314; G11B 5/6088; G11B 5/40; G11B 2005/0021; G11B 13/04
  USPC .......... 369/13.33, 13.32, 13.24, 13.14, 13.03, 369/13.02, 13.12, 13.13, 13.22, 13.01, 369/13.35, 112.27; 360/59, 125.31, 125.74; 29/603.6
  See application file for complete search history.

(56) References Cited

U.S. PATENT DOCUMENTS

| | | | |
|---|---|---|---|
| 5,909,340 A | 6/1999 | Lairson et al. | |
| 6,156,375 A | 12/2000 | Hu et al. | |
| 6,560,855 B1 | 5/2003 | Nakamura et al. | |
| 6,788,497 B1 | 9/2004 | Cates | |
| 6,867,940 B2 | 3/2005 | Pleiss | |
| 6,876,526 B2 | 4/2005 | Macken et al. | |
| 6,909,578 B1 | 6/2005 | Missell et al. | |
| 7,035,046 B1 | 4/2006 | Young et al. | |
| 7,092,208 B2 | 8/2006 | Zou et al. | |
| 7,102,853 B2 | 9/2006 | Macken et al. | |
| 7,123,447 B2 | 10/2006 | Pendray et al. | |
| 7,184,244 B1 | 2/2007 | Haddock et al. | |
| 7,193,814 B2 | 3/2007 | Han et al. | |
| 7,292,408 B2 | 11/2007 | Chiu et al. | |
| 7,320,168 B2 | 1/2008 | Han et al. | |
| 7,505,227 B2 | 3/2009 | Lee et al. | |
| 7,532,434 B1 | 5/2009 | Schreck et al. | |
| 7,542,246 B1 | 6/2009 | Song et al. | |
| 7,593,183 B2 | 9/2009 | Hsiao et al. | |
| 7,652,853 B2 | 1/2010 | Hosseinali et al. | |
| 7,791,839 B2 * | 9/2010 | Olson et al. .............. | 360/125.31 |
| 8,240,026 B2 | 8/2012 | Kagami et al. | |
| 8,248,891 B2 | 8/2012 | Lee et al. | |
| 8,279,556 B2 | 10/2012 | Ruiz | |

(Continued)

*Primary Examiner* — Ali Neyzari (57) ABSTRACT

A method fabricates a heat assisted magnetic recording (HAMR) transducer having an air-bearing surface (ABS) and that is optically coupled with a laser. The HAMR transducer includes a write pole, a waveguide, and at least one protective pad. The write pole has a pole tip with an ABS facing surface. The waveguide is located in a down track direction from the pole tip and directs light from the laser toward the ABS. The protective pad(s) are adjacent to the write pole and have front surface(s) at the ABS.

20 Claims, 8 Drawing Sheets

(56) References Cited

U.S. PATENT DOCUMENTS

| | | |
|---|---|---|
| 8,385,158 B1 * | 2/2013 | Hu et al. .................... 369/13.01 |
| 8,416,646 B2 * | 4/2013 | Huang et al. ............... 369/13.01 |
| 8,451,696 B2 * | 5/2013 | Huang et al. ............... 369/13.02 |
| 8,477,454 B2 * | 7/2013 | Zou et al. ................. 360/125.31 |
| 8,649,245 B2 * | 2/2014 | Goulakov et al. .......... 369/13.33 |
| 8,705,323 B2 * | 4/2014 | Contreras et al. .......... 369/13.32 |
| 2004/0125478 A1 | 7/2004 | Kim et al. |
| 2013/0070576 A1 | 3/2013 | Zou et al. |

* cited by examiner

HEAT ASSISTED MAGNETIC RECORDING TRANSDUCER HAVING PROTECTIVE PADS

CROSS-REFERENCE TO RELATED APPLICATIONS

This application claims priority to provisional U.S. Patent Application Ser. No. 61/807,530, filed on Apr. 2, 2013, which is hereby incorporated by reference in its entirety.

BACKGROUND

Figure 1:
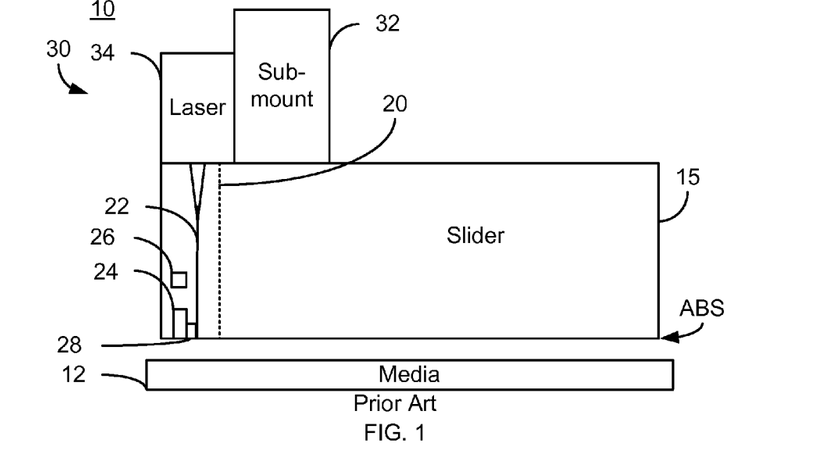
FIG. 1 is a diagram depicting a conventional HAMR disk drive.

FIG. 1 depicts a side view of a portion a conventional HAMR disk drive 100. For clarity, FIG. 1 is not to scale. For simplicity not all portions of the conventional HAMR disk drive 10 are shown. The HAMR disk drive 10 includes media 12, a slider 15, a HAMR head 20, and a laser assembly 30. Although not shown, the slider 15 and thus the laser assembly 30 and HAMR transducer 20 are generally attached to a suspension (not shown). The HAMR transducer 20 includes an air-bearing surface (ABS) proximate to the media 12 during use. The HAMR transducer 12 includes a waveguide 22, write pole 24, coil(s) 26 and near-field transducer (NFT) 28. The waveguide 22 guides light to the NFT 28, which resides near the ABS. The NFT 28 focuses the light to magnetic recording media 12, heating a region of the magnetic media 12 at which data are desired to be recorded. High density bits can be written on a high coercivity medium with the pole 24 energized by the coils 26 to a modest magnetic field.

Although the conventional HAMR disk drive 10 functions, there are drawbacks. The pole 24 and NFT 28 include regions that are at the air-bearing surface (ABS). These regions may be surrounded by materials such as alumina and silica. The pole 24 and/or NFT 28 may inadvertently contact the media 12 or may come into contact with the media 12 during touchdown. As a result, structures in the HAMR transducer 12 may be subject to damage.

Accordingly, what is needed is an improved HAMR transducer having improved robustness and/or reliability.

DETAILED DESCRIPTION OF THE PREFERRED EMBODIMENTS

Figure 2:
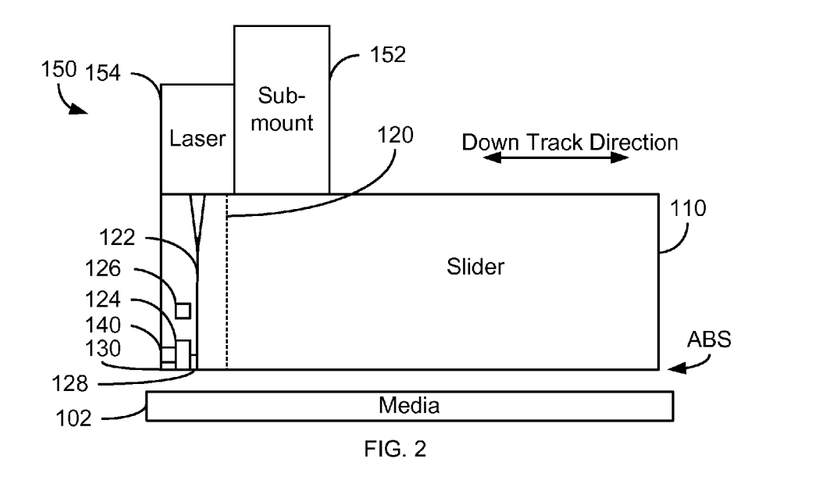
FIG. 2 is a diagram depicting an exemplary embodiment of a HAMR disk drive.

FIG. 2 depicts a side view of an exemplary embodiment of a portion of a HAMR disk drive 100. For clarity, FIG. 2 is not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 120 and 150 are shown. However, multiples of each components 102, 110, 120, and/or 150 and their sub-components, might be used.

The HAMR disk drive 100 includes media 102, a slider 110, a HAMR transducer 120, and a laser assembly 150. Additional and/or different components may be included in the HAMR disk drive 100. Although not shown, the slider 110, and thus the laser assembly 150 and HAMR transducer 120 are generally attached to a suspension (not shown). The HAMR transducer 120 is fabricated on the slider 110 and includes an air-bearing surface (ABS) proximate to the media 102 during use. In general, the HAMR transducer 120 includes a write transducer and a read transducer. However, for clarity, only the write portion of the HAMR head 120 is shown. The HAMR head 120 includes a waveguide 122, write pole 124, coil(s) 126, near-field transducer (NFT) 128, protective pad(s) 130 and shield(s) 140. In other embodiments, different and/or additional components may be used in the HAMR head 120. The waveguide 122 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field. The write pole 124 is thus formed of high saturation magnetization material(s) such as CoFe.

The laser assembly 150 includes a submount 152 and a laser 154. The submount 152 is a substrate to which the laser 154 may be affixed for improved mechanical stability, ease of manufacturing and better robustness. The laser 154 may be a chip such as a laser diode. Thus, the laser 154 typically includes at least a resonance cavity, a gain reflector on one end of the cavity, a partial reflector on the other end of the cavity and a gain medium. For simplicity, these components of the laser 154 are not shown in FIG. 2. In some embodiments, the laser 154 may be an edge emitting laser, a vertical surface emitting laser (VCSEL) or other laser.

In operation, the laser 154 emits light that is provided to the waveguide 122. The waveguide 122 directs the modulated light to the NFT 128. The NFT 128 focuses the modulated light to a region of magnetic recording media 102 using surface plasmons. The NFT 128 thus couples the optical energy of the modulated light into the recording medium layer of the media 102 with a confined optical spot that is much smaller than the optical diffraction limit. This optical spot can typically heat the recording medium layer above the Curie point on the sub-nanosecond scale. High density bits can be written on a high coercivity medium with the pole 124 energized by the coils 126 to a modest magnetic field.

In addition, the HAMR transducer 120 includes protective pads 130 and shield(s) 140. The shield(s) 140 are recessed from the ABS, as depicted in FIG. 2. In the absence of the protective pads 130, therefore, the some other material would reside between the shield(s) 140 and the ABS. For example, if the protective pads 130 were not present alumina or silicon dioxide might reside between the shield(s) 140 and the ABS.

The protective pads 130 are termed "protective" because in some embodiments, the protective pad(s) may protect the NFT 128 and the pole 124 if the transducer 120 inadvertently contacts the media 102. Although shown in the down track direction from the pole 124, at least some of the protective pad(s) 140 may reside in the cross track direction from the pole 124. In some embodiments, the protective pad(s) 140 include magnetic material. In other embodiments the protective pad(s) 140 include nonmagnetic material(s). For example, the protective pad(s) 140 may include at least one of NiFe, tantalum oxide, CoNiFe, Ta and aluminum nitride. In some embodiments, the protective pad(s) 140 include or consist of material(s) that have substantially the same etch and/or lapping characteristics as the pole 124. In some embodiments, the protective pad(s) 140 include or consist of material(s) that have substantially the same etch and lapping characteristics as the shield(s) 140. The protective pad(s) 130 may also have substantially the same thermal characteristics as the pole 124 and surrounding structures. For example, the protective pad(s) 130 may have substantially the same thermal conductivity as the pole 130. In addition, the material(s) used for the pad(s) 130 are desired to have little or no impact on the optical and magnetic performance of the transducer 120.

The pad(s) 130 may improve the performance and robustness of the HAMR transducer 120. In particular, the pad(s) 130 may improve the wear resistance of the HAMR transducer 120. The pad(s) 130 may have substantially the same etch and lapping characteristics as the pole 124. In such embodiments, the removal rate of the pad(s) 130 during fabrication is substantially the same as the pole 124. Thus, the pole 124 may not protrude from the ABS with respect to surrounding structures. Instead, the recession of the pole 124 may be approximately the same as the pads 130. This may be in contrast to the conventional HAMR transducer 20, in which aluminum oxide or silicon dioxide structures surrounding the pole 24 are recessed from the pole because the surrounding structures' removal rates are greater than that of the pole 24. Thus, the pad(s) 130 may reduce the likelihood of or prevent the pole 124 from being the closest point to the media 102. As a result, the pad(s) 130 may protect the pole 124 if the transducer 120 contacts the media 102. The pad(s) 130 may also protect the pole 124 during touchdown. This is particularly true if the pad(s) 130 are sufficiently large at the ABS. If the pad(s) 130 have similar thermal properties to the pole 124, then expansion or contraction of the structures 130 and 124 may be similar during operation of the HAMR disk drive 100. Thus, the pad(s) 130 may still protect the pole 124 from wear or other physical damage. The pad(s) 130 may be of nonmagnetic material or magnetic material configured to reduce their impact to the magnetics of the HAMR transducer 120. Thus, the pole 124 used in writing to the media 102 may be protected from damage and/or wear. Thus, performance and robustness of the HAMR transducer 100 may be improved.

Figure 3A:
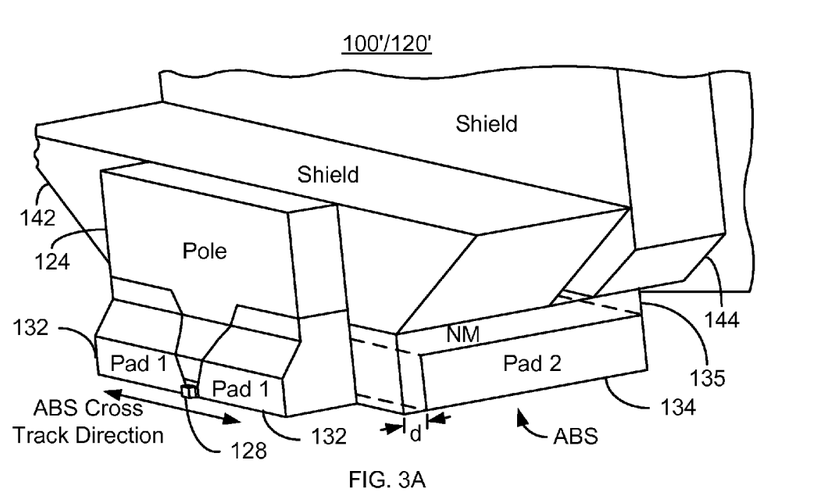
FIGS. 3A-3B are perspective views of another exemplary embodiment of a portion of a HAMR disk drive.
Figure 3B:
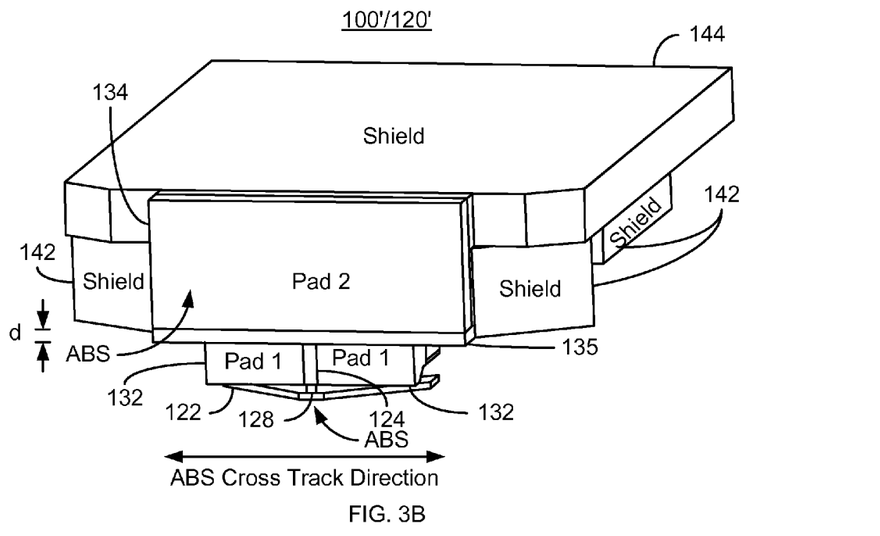

FIGS. 3A-3B are perspective views of another exemplary embodiment of a portion of a HAMR disk drive 100'. FIGS. 3A and 3B are not to scale. The HAMR disk drive 100' is analogous to the HAMR disk drive 100. However, some other components, such as the media 102 depicted in FIG. 2 are not shown for simplicity. In contrast, similar components shown in FIGS. 3A and 3B have analogous labels to those in FIG. 2. The HAMR transducer 100' includes an NFT 128, a waveguide 122 (shown in FIG. 3B) and write pole 124 analogous to those depicted in FIG. 2. As can be seen in FIGS. 3A and 3B, the write pole includes a pole tip region that has an ABS facing surface and is adjacent to the NFT 128. In addition, shields 142 and 144 corresponding to shield 140 are also shown. Note that the shields 142 and 144 are recessed from the ABS. The shields 142 and 144 are also in the down track direction from the pole 124.

The HAMR transducer 120' also includes two protective pads 132 and 134 that correspond to the pad(s) 130 shown in FIG. 2. Referring back to FIGS. 3A-3B, the pads 132 and 134 may have substantially the same etch and lapping characteristics as the pole 124. Each of the pads 132 and 134 may include at least one of NiFe, tantalum oxide, CoNiFe, Ta and aluminum nitride. A portion of each of the pads 132 and 134 resides at the ABS. The pads 132 and 134 may be made of nonmagnetic material(s) or magnetic material(s). If the pad 134 is magnetic, a nonmagnetic layer 135 may be interposed between the pad 134 and the shield(s) 142 and 144. If the pad 132 is magnetic, then a nonmagnetic layer (not shown) may be interposed between the pad 132 and the write pole 124. In the embodiment shown, the pad 132 includes two parts on either side of the pole 124 in the cross track direction. More specifically, portions of the pad 132 may adjacent to the tip of the pole 124. In other embodiments, the portions of the pad 132 adjoin the tip of the pole. In some embodiments, the width of each portion of the pad 132 is at least four microns in the cross track direction. Thus, the width of each portion of the pad 132 is at least five microns. In some embodiments, the total width is at least ten microns. In some embodiments, the pad 134 has a width of at least one and not more than five microns in the down track direction and at least four and not more than sixteen microns in the cross-track direction.

The pad 134 resides between the shields 142 and 144 and the ABS. Thus, the shields 142 and 144 are recessed from the ABS. Further, a nonmagnetic layer 135 resides between pad 134 and the shields 142 and 144. The nonmagnetic layer 135 may be used if the pad 134 is magnetic. In some embodiments, the nonmagnetic layer 135 is at least 0.25 microns thick. In some such embodiments, the nonmagnetic layer 135 is at least 0.5 microns thick. The nonmagnetic layer 135 may be not more than one micron thick.

The pads 132 and 134 may improve the performance and robustness of the HAMR transducer 120'. The pads 132 and 134 may have substantially the same etch and lapping characteristics as the pole 124. In such embodiments, the removal rate of the pads 132 and 134 during fabrication is substantially the same as the pole 124. Thus, the pole 124 may not protrude from the ABS with respect to the pads 132 and 134. As a result, the pads 132 and 134 may protect the pole 124 if the transducer 120' contacts the media (not shown in FIGS. 3A and 3B). The pads 132 and 134 may also protect the pole 124 during touchdown, particularly as the pads 132 and 134 may be sufficiently large at the ABS. If the pads 132 and 134 have similar thermal properties to the pole 124, then expansion or contraction of the pads 132 and 134 and pole 124 may be similar during operation of the HAMR disk drive 100'. Thus, the pads 132 and 134 may still protect the pole 124 from wear or other physical damage. The pads 132 and 134 may be of nonmagnetic material or magnetic material configured to reduce their impact to the magnetics of the HAMR transducer 120'. Thus, the pole 124 may be protected from damage and/or wear. Thus, performance and robustness of the HAMR transducer 100' may be improved.

Figure 4A:
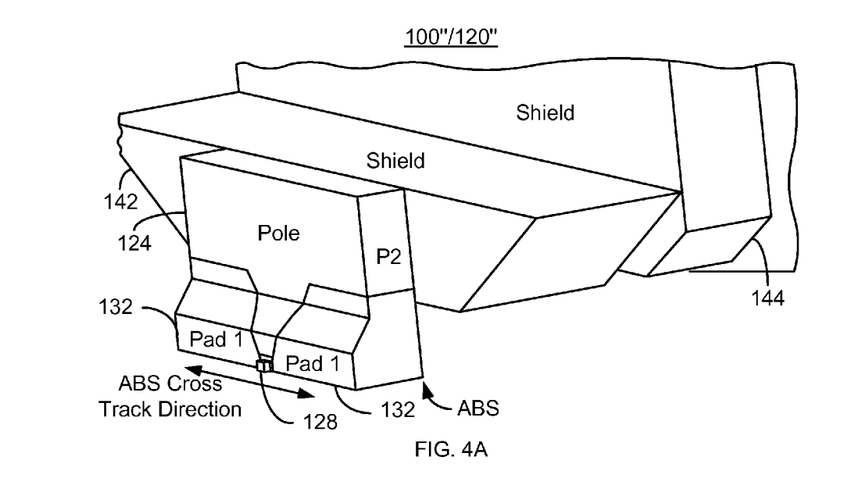
FIGS. 4A-4B are perspective views of another exemplary embodiment of a HAMR disk drive.
Figure 4B:
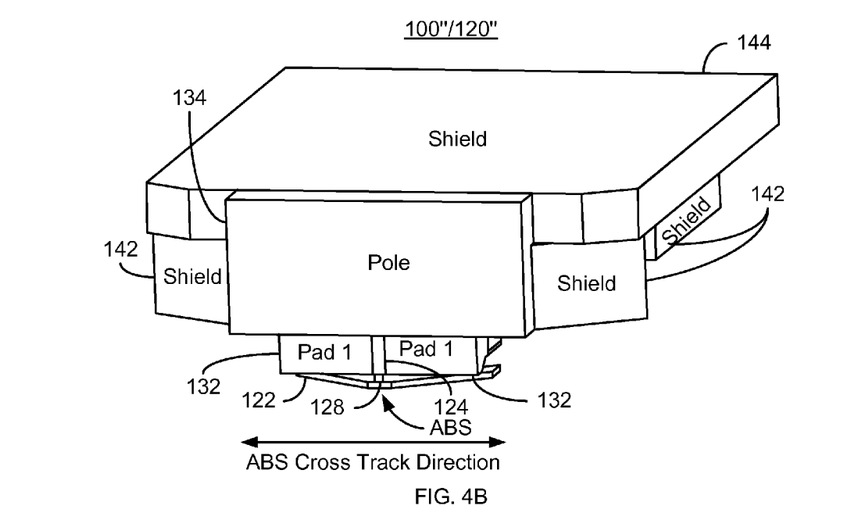

FIGS. 4A-4B are perspective views of another exemplary embodiment of a portion of a HAMR disk drive 100". FIGS. 4A and 4B are not to scale. The HAMR disk drive 100" is analogous to the HAMR disk drives 100 and 100'. However, some other components, such as the media 102 depicted in FIG. 2 are not shown for simplicity. In contrast, similar components shown in FIGS. 4A and 4B have analogous labels to those in FIGS. 2 and 3A-3B. The HAMR transducer 100"

includes an NFT 128, a waveguide 122 (shown in FIG. 3B) and write pole 124 analogous to those depicted in FIGS. 2 and 3A-3B. As can be seen in FIGS. 4A and 4B, the write pole includes a pole tip region that has an ABS facing surface and is adjacent to the NFT 128. In addition, shields 142 and 144 corresponding to shield 140 are also shown. Note that the shields 142 and 144 are recessed from the ABS. The shields 142 and 144 are also in the down track direction from the pole 124.

The HAMR transducer 120" also includes a single protective pad 132 that corresponds to the pads 130, 132 and 134 shown in FIGS. 2, 3A and 3B. Referring back to FIGS. 4A-4B, the pad 132 may have substantially the same etch and lapping characteristics as the pole 124. The pad 132 may include at least one of NiFe, tantalum oxide, CoNiFe, Ta and aluminum nitride. A portion of the pad 132 resides at the ABS. The pad 132 may be made of nonmagnetic material(s) or magnetic material(s). If the pad 132 is magnetic, then a nonmagnetic layer (not shown) may be interposed between the pad 132 and the pole 124. In the embodiment shown, the pad 132 includes two parts on either side of the pole 124 in the cross track direction. More specifically, portions of the pad 132 may adjacent to the tip of the pole 124. In other embodiments, the portions of the pad 132 adjoin the tip of the pole. In some embodiments, the width of each portion of the pad 132 is at least four microns in the cross track direction. Thus, the width of each portion of the pad 132 is at least five microns. In some embodiments, the total width is not more than ten microns.

The pad 132 may improve the performance and robustness of the HAMR transducer 120' in an analogous manner to the pads 130, 132 and 134. The pad 132 may protect the pole 124 from wear or other physical damage. The pad 132 may be of nonmagnetic material or magnetic material configured to reduce their impact to the magnetics of the HAMR transducer 120'. Thus, the pole 124 may be protected from damage and/or wear. Thus, performance and robustness of the HAMR transducer 100" may be improved.

Figure 5A:
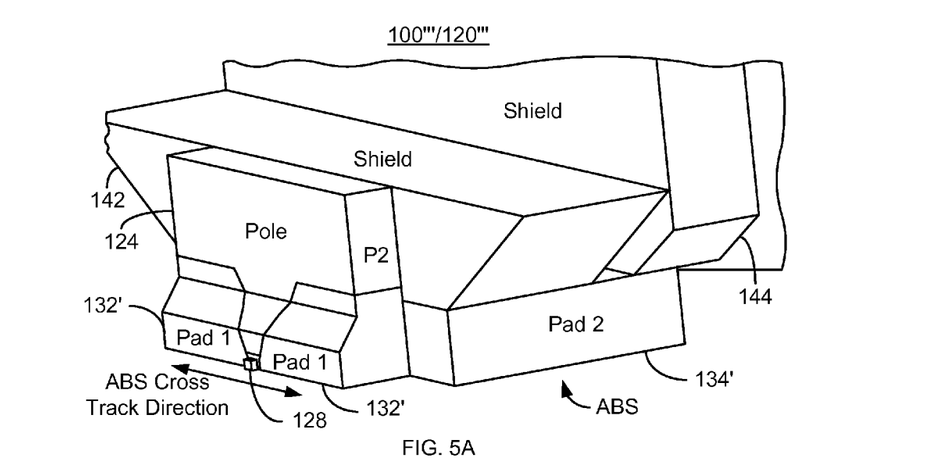
FIGS. 5A-5B are perspective views of another exemplary embodiment of a portion of a HAMR disk drive.
Figure 5B:
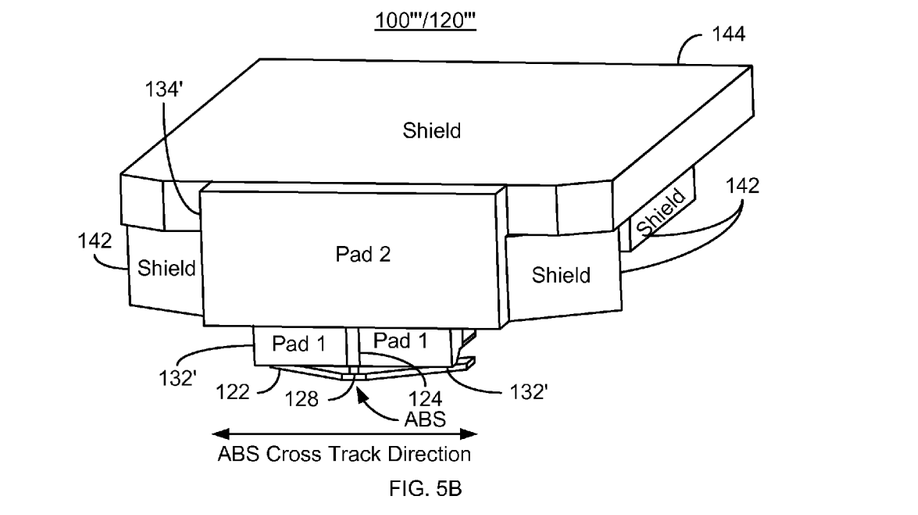

FIGS. 5A-5B are perspective views of another exemplary embodiment of a portion of a HAMR disk drive 100'''. FIGS. 5A and 5B are not to scale. The HAMR disk drive 100''' is analogous to the HAMR disk drives 100, 100' and 100". However, some other components, such as the media 102 depicted in FIG. 2 are not shown for simplicity. In contrast, similar components shown in FIGS. 5A and 5B have analogous labels to those in FIGS. 2, 3A-3B and 4A-4B. The HAMR transducer 100" includes an NFT 128, a waveguide 122 (shown in FIG. 3B) and write pole 124 analogous to those depicted in FIGS. 2, 3A-3B and 4A-4B. As can be seen in FIGS. 5A and 5B, the write pole includes a pole tip region that has an ABS facing surface and is adjacent to the NFT 128. In addition, shields 142 and 144 corresponding to shield 140 are also shown. Note that the shields 142 and 144 are recessed from the ABS. The shields 142 and 144 are also in the down track direction from the pole 124.

The HAMR transducer 120''' also includes two protective pads 132' and 134' that correspond to the pad(s) 130, 132 and 134 shown in FIGS. 2, 3A-3B and 4A-4B. Referring back to FIGS. 5A-5B, the pads 132' and 134' may have substantially the same etch and lapping characteristics as the pole 124. Each of the pads 132 and 134 may include at least one of tantalum oxide, Ta and aluminum nitride. Thus, at least the pad 134' is nonmagnetic. As a result, the nonmagnetic layer between the pad 134' and the shields 142 and 144 may be omitted. Instead, the pad 134' may adjoin the shields 142 and 144. Similarly, if the pad 132' is nonmagnetic, then any nonmagnetic layer between the portions of the pad 132' and the pole(s) 124 may also be omitted. In the embodiment shown, the pad 132' includes two parts on either side of the pole 124 in the cross track direction. More specifically, portions of the pad 132' may adjacent to the tip of the pole 124. In other embodiments, the portions of the pad 132' adjoin the tip of the pole. In some embodiments, the width of each portion of the pad 132' is at least four microns in the cross track direction. Thus, the width of each portion of the pad 132' is at least five microns. In some embodiments, the total width is not more than ten microns. In some embodiments, the pad 134' has a width of at least one and not more than five microns in the down track direction and at least four and not more than sixteen microns in the cross-track direction.

The pads 132' and 134' may improve the performance and robustness of the HAMR transducer 120''' in an analogous manner to the pads 130, 132 and 134. The pads 132' and 134' may protect the pole 124 from wear or other physical damage. The pads 132' and 134' may be of nonmagnetic material to reduce their impact to the magnetics of the HAMR transducer 120'''. Thus, the pole 124 may be protected from damage and/or wear and robustness of the HAMR transducer 100''' improved.

Figure 6A:
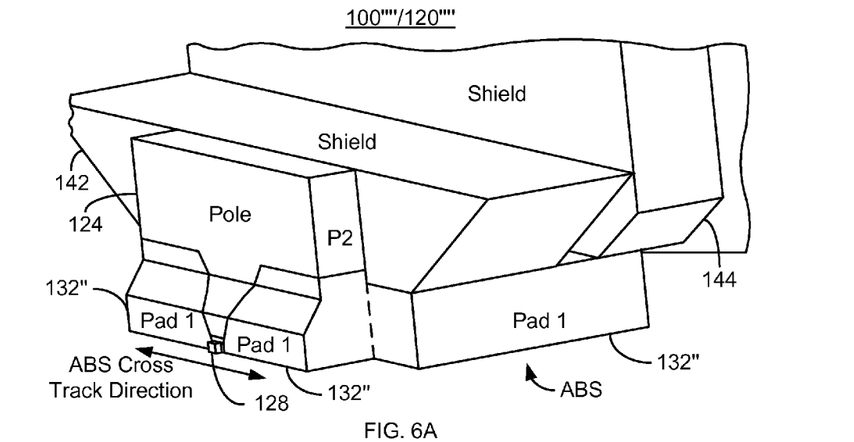
FIGS. 6A-6B are perspective views of another exemplary embodiment of a HAMR head disk drive
Figure 6B:
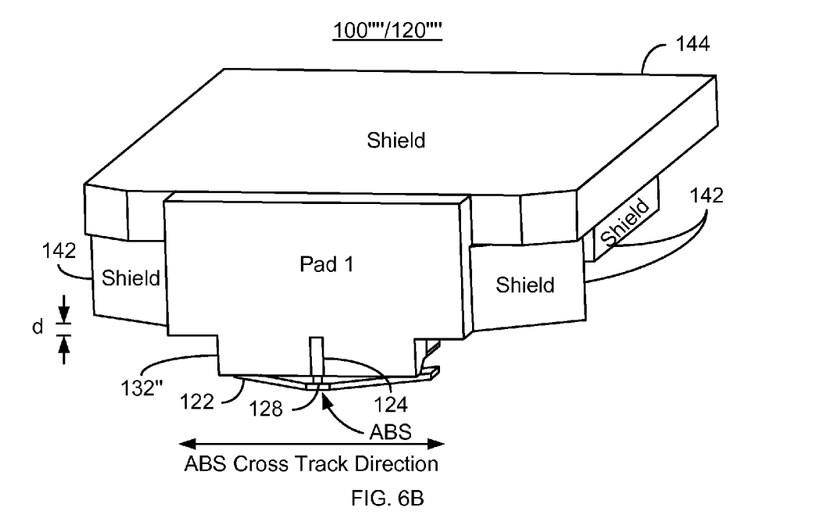

FIGS. 6A-6B are perspective views of another exemplary embodiment of a portion of a HAMR disk drive 100''''. FIGS. 6A and 6B are not to scale. The HAMR disk drive 100'''' is analogous to the HAMR disk drives 100, 100', 100" and 100'''. However, some other components, such as the media 102 depicted in FIG. 2 are not shown for simplicity. In contrast, similar components shown in FIGS. 6A and 6B have analogous labels to those in FIGS. 2, 3A-3B, 4A-4B and 5A-5B. The HAMR transducer 100''' includes an NFT 128, a waveguide 122 (shown in FIG. 3B) and write pole 124 analogous to those depicted in FIGS. 2, 3A-3B, 4A-4B and 5A-5B. As can be seen in FIGS. 6A and 6B, the write pole includes a pole tip region that has an ABS facing surface and is adjacent to the NFT 128. In addition, shields 142 and 144 corresponding to shield 140 are also shown. Note that the shields 142 and 144 are recessed from the ABS. The shields 142 and 144 are also in the down track direction from the pole 124. Thus, the write pole 124 is between the waveguide 122 and the shields 142 and 144.

The HAMR transducer 120'''' also includes a single composite protective pad 132" that correspond to the pad(s) 130, 132 and 134, 132' and 134' shown in FIGS. 2, 3A-3B, 4A-4B and 5A-5B. Referring back to FIGS. 6A-6B, the pad 132" may have substantially the same etch and lapping characteristics as the pole 124. The pad 132" is used when the two pads 132 and 134 are incorporated into a single pad. Thus, the pad 132" is composed of a single set of material(s). The pad 132" may include at least one of tantalum oxide, Ta and aluminum nitride. Thus, pad 132" is nonmagnetic in the embodiment shown. As a result, the nonmagnetic layer between the pad 132" and the shields 142 and 144 may be omitted. Instead, the pad 132" may adjoin the shields 142 and 144. In other embodiments, the pad 132" may be magnetic. In such embodiments, a nonmagnetic layer may be interposed between the pad 132" and the pole 124 and shields 142 and 144. The dimensions of the pad 132" may be analogous to those described above for the pads 130, 132 and 134 and 132' and 134'.

The pad 132" may improve the performance and robustness of the HAMR transducer 120'''' in an analogous manner to the pads 130, 132 and 134 and 132' and 134'. The pad 132" may protect the pole 124 from wear or other physical damage. The pad 132" may be formed of nonmagnetic material to reduce its impact on the magnetics of the HAMR transducer

120''''. Thus, the pole 124 may be protected from damage and/or wear and robustness of the HAMR transducer 100'''' improved.

Figure 7A:
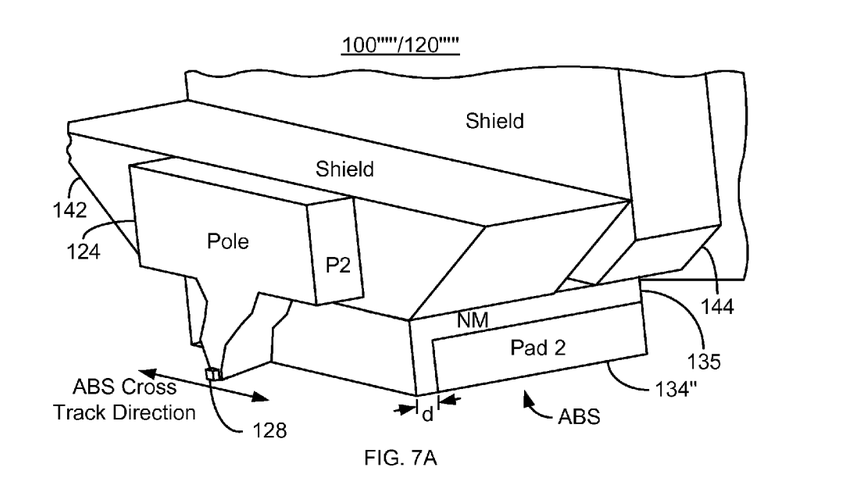
FIGS. 7A-7B are perspective views of another exemplary embodiment of a HAMR disk drive.
Figure 7B:
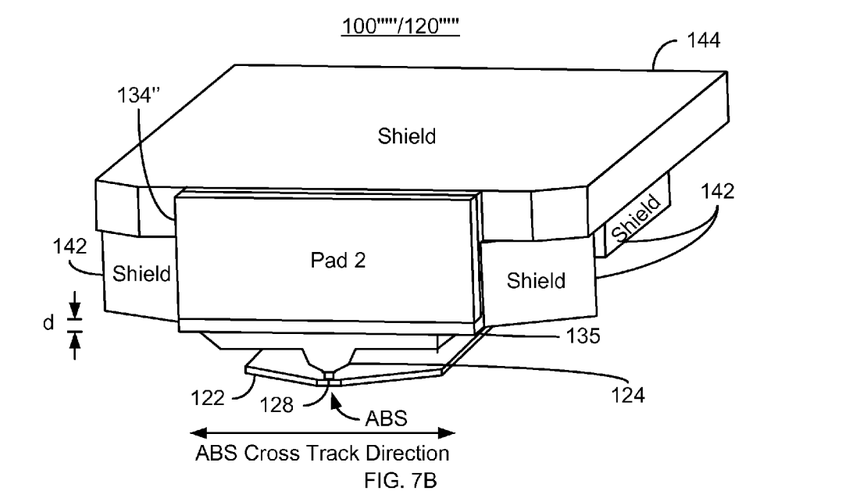

FIGS. 7A-7B are perspective views of another exemplary embodiment of a portion of a HAMR disk drive 100'''''. FIGS. 7A and 7B are not to scale. The HAMR disk drive 100''''' is analogous to the HAMR disk drives 100, 100', 100'', 100''' and 100''''. However, some other components, such as the media 102 depicted in FIG. 2 are not shown for simplicity. In contrast, similar components shown in FIGS. 7A and 7B have analogous labels to those in FIGS. 2, 3A-3B, 4A-4B and 5A-5B. The HAMR transducer 100''''' includes an NFT 128, a waveguide 122 (shown in FIG. 3B) and write pole 124 analogous to those depicted in FIGS. 2, 3A-3B, 4A-4B, 5A-5B and 6A-6B. As can be seen in FIGS. 7A and 7B, the write pole includes a pole tip region that has an ABS facing surface and is adjacent to the NFT 128. In addition, shields 142 and 144 corresponding to shield 140 are also shown. Note that the shields 142 and 144 are recessed from the ABS. The shields 142 and 144 are also in the down track direction from the pole 124. Thus, the write pole 124 is between the waveguide 122 and the shields 142 and 144.

The HAMR transducer 120'''' also includes a single protective pad 134'' that corresponds to the pad(s) 130, 134, 134'' shown in FIGS. 2, 3A-3B, 4A-4B and 5A-5B. Referring back to FIGS. 6A-6B, the pad 134'' may have substantially the same etch and lapping characteristics as the pole 124. The pad 134'' is used when the pads 132 is omitted. The pad 134'' may include at least one of NiFe, CoNiFe, tantalum oxide, Ta and aluminum nitride. Thus, pad 134'' may be magnetic or nonmagnetic in the embodiment shown. If the pad 134'' is magnetic, then a nonmagnetic layer 135 is between the pad 134'' and the shields 142 and 144. In contrast, if the pad 134'' is nonmagnetic, then the nonmagnetic layer 135 may be omitted.

The pad 134'' may improve the performance and robustness of the HAMR transducer 120'''' in an analogous manner to the pads 130, 132 and 134, 132' and 134' and 132''. The pad 134'' may protect the pole 124 from wear or other physical damage. The pad 134'' may be formed of nonmagnetic material to reduce its impact on the magnetics of the HAMR transducer 120''''. Thus, the pole 124 may be protected from damage and/or wear and robustness of the HAMR transducer 100'''' improved.

Figure 8:
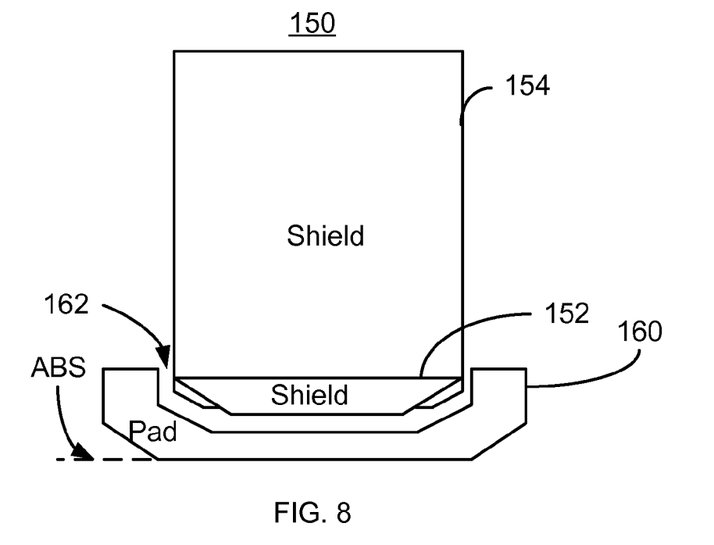
FIG. 8 is a plan view of another exemplary embodiment of a HAMR head.

FIG. 8 is a plan view of another exemplary embodiment of a portion of a HAMR disk drive 150. FIG. 8 is not to scale. The HAMR disk drive 150 is analogous to the HAMR disk drives 100, 100', 100'', 100''', 100'''' and 100'''''. However, only some components are not shown for simplicity. The HAMR disk drive 150 includes shields 152 and 154 that are analogous to the shields 142 and 144, respectively. Also shown is pad 160 that corresponds to protective pad(s) 130, 132 and 134, 132' and 134', 132'' and 134''. The pad 160 is formed of analogous material(s) and has an analogous function as the pads 130, 132, 134, 132', 134', 132'' and 134''. The pad 160 may have substantially the same etch and lapping characteristics as the pole (not shown in FIG. 8). The pad 160 may be magnetic or nonmagnetic in the embodiment shown. If the pad 160 is magnetic, then a nonmagnetic layer 162 is between the pad 160 and the shields 152 and 154. In contrast, if the pad 160 is nonmagnetic, then the nonmagnetic layer 162 may be omitted.

The pad 160 may improve the performance and robustness of the HAMR transducer 150 in an analogous manner to the pads 130, 132 and 134, 132' and 134', 132'' and 134''. The pad 150 may protect the pole from wear or other physical damage. The pad 160 may be formed of nonmagnetic material to reduce its impact on the magnetics of the HAMR transducer 150. Thus, the pole may be protected from damage and/or wear and robustness of the HAMR transducer 150 improved.

Figure 9:
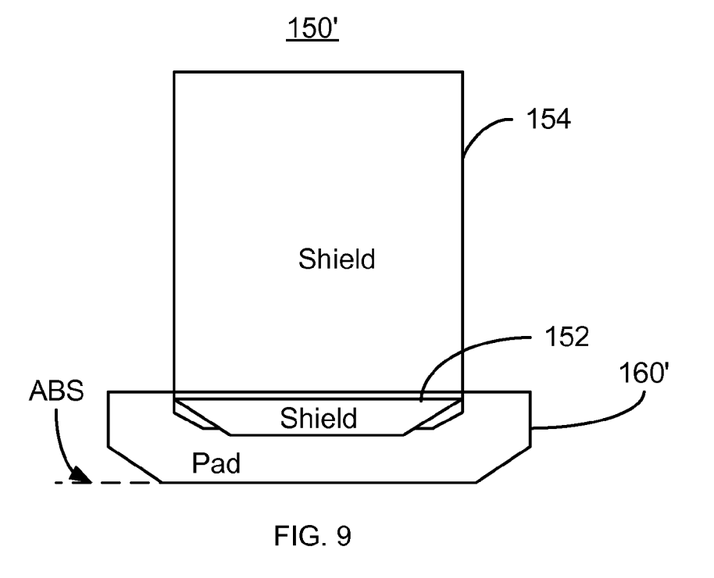
FIG. 9 is a plan view of another exemplary embodiment of a HAMR head.

FIG. 9 is a plan view of another exemplary embodiment of a portion of a HAMR disk drive 150'. FIG. 8 is not to scale. The HAMR disk drive 150' is analogous to the HAMR disk drives 100, 100', 100'', 100''', 100'''', 100''''' and 150. However, only some components are not shown for simplicity. The HAMR disk drive 150' includes shields 152 and 154 that are analogous to the shields 142 and 144 as well as 152 and 154, respectively. Also shown is pad 160' that corresponds to protective pad(s) 130, 132,134, 132', 134', 132'', 134'' and 160. The pad 160 is formed of analogous material(s) and has an analogous function as the pads 130, 132, 134, 132', 134', 132'', 134'' and 160. The pad 160' may have substantially the same etch and lapping characteristics as the pole (not shown in FIG. 9). In the embodiment shown in FIG. 9, the shield 160' is nonmagnetic. Thus, no nonmagnetic layer is provided between the pad 160' and the shield 152'.

The pad 160' may improve the performance and robustness of the HAMR transducer 150' in an analogous manner to the pads 130, 132, 134, 132', 134', 132'', 134'' and 160. The pad 160' may protect the pole from wear or other physical damage. The pad 160' may be formed of nonmagnetic material to reduce its impact on the magnetics of the HAMR transducer 150'. Thus, the pole may be protected from damage and/or wear and robustness of the HAMR transducer 150' improved. Further, various features are shown in the HAMR disk drives 100, 100', 100'', 100''', 100'''', 100''''', 150 and 150'. One or more of these features may be combined in various embodiments. Thus, the benefits of one or more of the benefits of the disk drives 100, 100', 100'', 100''', 100'''', 100''''', 150 and 150' may be achieved.

Figure 10:
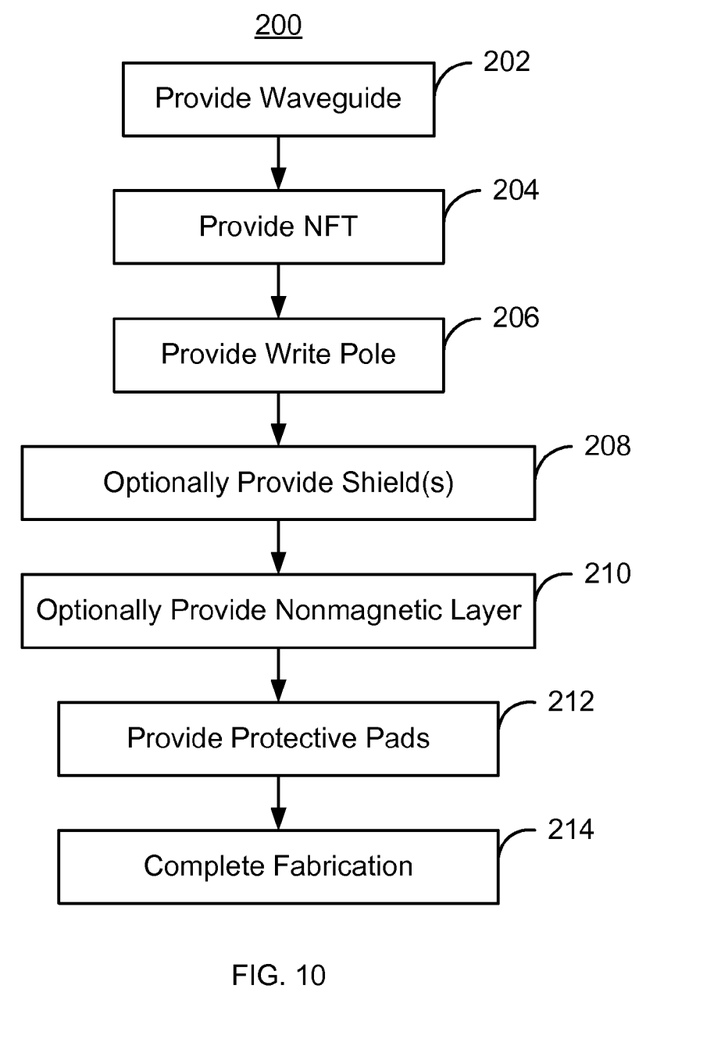
FIG. 10 is a flow chart depicting an exemplary embodiment of a method for fabricating a HAMR transducer.

FIG. 10 is a flow chart depicting an exemplary embodiment of a method 200 for fabricating a HAMR transducer. The method 200 is described in the context of the HAMR transducer 120', though other transducers might be so fabricated. For simplicity, some steps may be omitted, performed in another order, and/or combined. The magnetic recording transducer being fabricated may be part of a merged head that also includes a read head (not shown) and resides on a slider in a disk drive. The method 200 is also described in the context of a single transducer. However, the method 200 may be used to fabricate multiple transducers at substantially the same time. The method 200 and system are also described in the context of particular layers and particular structures. However, in some embodiments, such layers may include multiple sub-layers and/or other structures. The method 200 also may commence after formation of other portions of the transducer.

The waveguide 122 is also provided, via step 202. An NFT 128 is also provided, via step 204. A write pole 124 is provided, via step 206. The shield(s) 142 and/or 144 may be provided, via step 208. Steps 202, 204, 206 and 208 typically include multiple substeps.

The nonmagnetic layer 135 may optionally be provided via step 219. Step 210 may be omitted, for example if the pads 132 and 134 are nonmagnetic. The protective pad(s) 132 and/or 134 are provided, via step 212. Step 212 may include depositing the desired magnetic or nonmagnetic materials and patterning the materials. Fabrication may then be completed, via step 212. Step 212 may include etching and/or lapping the transducer being fabricated.

Thus, using the method 200, the HAMR transducer 100, 100', 100'', 100''', 100'''', 100''''', 150 and/or 150' may be fabricated. Thus, the benefits of the transducer 100, 100', 100'', 100''', 100'''', 100''''', 150 and/or 150' may be attained.

We claim:

1. A heat assisted magnetic recording (HAMR) transducer having air-bearing surface (ABS) and being optically coupled with a laser, the HAMR transducer comprising:
 a write pole having a pole tip with an ABS facing surface;
 a waveguide in a down track direction from the pole tip for directing light from the laser toward the ABS; and
 at least one protective pad adjacent to the write pole and having at least one front surface at the ABS.

2. The HAMR transducer of claim 1 wherein the at least one protective pad includes a first pad adjacent to the pole in a cross track direction from the pole tip.

3. The HAMR transducer of claim 1 wherein the first pad includes a first portion and a second portion, the pole tip residing between the first portion and the second portion.

4. The HAMR transducer of claim 3 wherein the first pad has a width of at least four microns in the cross track direction.

5. The HAMR transducer of claim 2 further comprising:
 at least one shield recessed from the ABS and in a down track direction from the write pole, the write pole being between the waveguide and the at least one shield; and
 wherein the at least one protective pad includes a second pad in a down track direction from the write pole, a portion of the second pad being between the at least one shield and the ABS.

6. The HAMR transducer of claim 1 further comprising:
 at least one shield recessed from the ABS and in a down track direction from the write pole, the write pole being between the waveguide and the at least one shield.

7. The HAMR transducer of claim 6 wherein the at least one protective pad includes a first pad in a down track direction from the write pole, a portion of the first pad being between the at least one shield and the ABS.

8. The HAMR transducer of claim 7 wherein the first pad includes a magnetic material and wherein the HAMR transducer further includes:
 a nonmagnetic layer between the first pad and the write pole.

9. The HAMR transducer of claim 8 wherein a portion of the nonmagnetic layer is between the first pad and the shield.

10. The HAMR transducer of claim 8 further comprising:
 an additional pole adjoining the write pole, a portion of the nonmagnetic layer being between the additional pole and the first pad.

11. The magnetic transducer of claim 1 wherein the at least one protective pad includes at least one of NiFe, tantalum oxide, CoNiFe, Ta and aluminum nitride.

12. A heat assisted magnetic recording (HAMR) transducer having air-bearing surface (ABS) and being optically coupled with a laser, the HAMR transducer comprising:
 a write pole having a pole tip with an ABS facing surface;
 an additional pole adjoining the write pole;
 a waveguide in a down track direction from the pole tip for directing light from the laser toward the ABS;
 at least one shield recessed from the ABS and in a down track direction from the write pole, the write pole being between the waveguide and the at least one shield;
 a first protective pad adjoining the write pole and having a first surface at the ABS, the first protective pad having a first portion and a second portion the pole tip residing between the first portion and the second portion, the first pad having a width of at least four microns in the cross track direction and not more than eight microns in the cross track direction;
 a second protective pad in a down track direction from the write pole and having a second surface at the ABS, a portion of the second protective pad being between the at least one shield and the ABS.

13. The HAMR transducer of claim 12 wherein the second pad includes a magnetic material and wherein the HAMR transducer further includes:
 a nonmagnetic layer between the second pad and the write pole and between the second pad and the at least one shield.

14. The magnetic transducer of claim 12 wherein each of the first protective pad and the second protective pad includes at least one of NiFe, tantalum oxide, CoNiFe, Ta and aluminum nitride.

15. A HAMR disk drive comprising:
 a media,
 a slider, and
 a magnetic transducer coupled with the slider, the magnetic transducer having air-bearing surface (ABS), a write pole, a waveguide and at least one protective pad, the write pole having a pole tip with an ABS facing surface, the waveguide being in a down track direction from the pole tip and for directing light from the laser toward the ABS, the at least one protective pad being adjacent to the write pole and having at least one front surface at the ABS.

16. A method for providing heat assisted magnetic recording (HAMR) transducer having air-bearing surface (ABS) and being optically coupled with a laser, the HAMR transducer comprising:
 providing a write pole having a pole tip with an ABS facing surface;
 providing a waveguide in a down track direction from the pole tip for directing light from the laser toward the ABS; and
 providing at least one protective pad adjacent to the write pole and having at least one front surface at the ABS.

17. The method of claim 16 wherein the at least one protective pad includes a first pad adjacent to the write pole in a cross track direction from the pole tip.

18. The method of claim 17 further comprising:
 providing at least one shield recessed from the ABS and in a down track direction from the write pole, the write pole being between the waveguide and the at least one shield; and
 wherein the at least one protective pad includes a second pad in a down track direction from the write pole, a portion of the second pad being between the at least one shield and the ABS.

19. The method of claim 16 further comprising:
 providing at least one shield recessed from the ABS and in a down track direction from the write pole, the write pole being between the waveguide and the at least one shield; and
 wherein the at least one protective pad includes a first pad in a down track direction from the write pole, a portion of the first pad being between the at least one shield and the ABS.

20. The method of claim 16 wherein each of the at least one protective pad includes at least one of NiFe, tantalum oxide, CoNiFe, Ta and aluminum nitride.

* * * * *